United States Patent [19]
Imoto

[11] Patent Number: 6,160,964
[45] Date of Patent: Dec. 12, 2000

[54] CAMERA

[75] Inventor: Kazuo Imoto, Yokohama, Japan

[73] Assignee: Canon Kabushiki Kaisha, Tokyo, Japan

[21] Appl. No.: 09/289,709

[22] Filed: Apr. 12, 1999

[30] Foreign Application Priority Data

Apr. 15, 1998 [JP] Japan .................................. 10-119925

[51] Int. Cl.⁷ ............................ G03B 17/00; G03B 17/24
[52] U.S. Cl. ......................... 396/300; 396/310; 396/319; 396/429
[58] Field of Search .................... 396/310–321, 396/429, 300

[56] References Cited

U.S. PATENT DOCUMENTS 5,296,884  3/1994  Honda et al. ............................ 396/310
5,937,217  8/1999  Ohtsuka et al. ........................ 396/310

*Primary Examiner*—David M. Gray
*Attorney, Agent, or Firm*—Robin, Blecker & Daley

[57] ABSTRACT

A camera includes a recording device which records image information and character information on a recording medium, a receiving device provided for the Global Positioning System, and a setting circuit which sets a language of the character information on the basis of position information obtained by the receiving device.

14 Claims, 5 Drawing Sheets

CAMERA

BACKGROUND OF THE INVENTION

1. Field of the Invention

The present invention relates to a camera arranged to record image information on a recording medium.

2. Description of Related Art

Recently, there has been proposed, in Japanese Laid-Open Patent Application No. Hei 8-286256, a camera which is capable of obtaining positioning information, such as latitude, longitude, altitude or time, from GPS (Global Positioning System) satellites used for the car navigation system, changing photo-taking date information, such as year, month, day, o'clock and minute, to local time on the basis of the positioning information obtained by a GPS receiver and recording the local time on a recording medium.

Further, there has been proposed another camera which allows the photographer to give a title to a photo-taken image and is capable of recording the title together with the photo-taken image. In such a camera, the photographer is allowed to change, by operating an operation member, a language used for the title to one of a plurality of languages which are beforehand encoded and stored in the camera.

However, in the above proposed camera, in recording a title, a language of the title to be recorded is usually set to the photographer's own language. Therefore, in a case where the photographer takes a photograph in a foreign country during overseas travel or the like, if he or she intends to record the title in a language of the foreign country, it is required that he or she operate the operation member to change the setting of language, which is troublesome for the photographer. Also, in such a situation, a problem arises in that there is a possibility that the photographer may forget the setting of language or may make a mistake about the setting of language.

BRIEF SUMMARY OF THE INVENTION

It is an object of the invention to provide a camera capable of setting a language of a title on the basis of position information obtained from the Global Positioning System and recording, on a recording medium, image information and title information in which the title language has been set.

To attain the above object, in accordance with an aspect of the invention, there is provided a camera, which comprises a recording device which records image information and character information on a recording medium, a receiving device provided for the Global Positioning System, and a setting circuit which sets a language of the character information on the basis of position information obtained by the receiving device.

The above and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
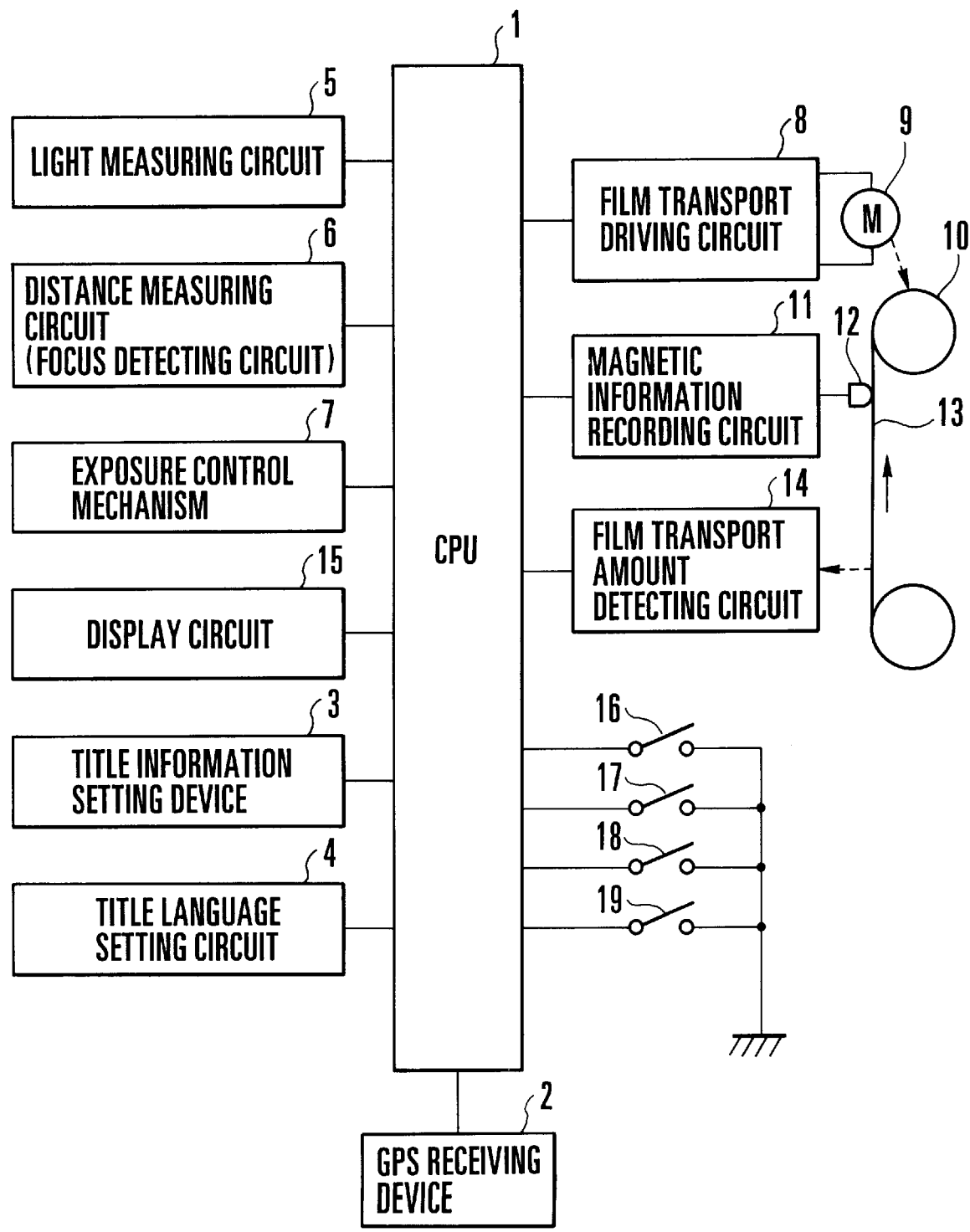
FIG. 1 is a block diagram showing the entire construction of a camera according to each embodiment of the invention.

FIG. 1 is a block diagram showing the electrical construction of a camera according to a first embodiment of the invention. As will be described later, the camera is capable of setting a language used for a title to be recorded to a language corresponding to an area in which a photo-taking operation is performed, and recording the title whose language has been set, on a recording part of a corresponding photo-taking frame of film.

Referring to FIG. 1, the camera includes a CPU 1 arranged to control the entirety of the camera, a GPS receiving device 2 arranged to receive radio waves from GPS satellites (not shown), a title information setting device 3 arranged to select and set a title as desired by the photographer to be recorded, from among a plurality of encoded titles stored in the CPU 1, a title language setting circuit 4 arranged to select and set a language to be used for recording the title set by the title information setting device 3, from among a plurality of encoded languages stored in the CPU 1, a light measuring circuit 5, a distance measuring (focus detecting) circuit 6, an exposure control mechanism 7, and a film transport driving circuit 8 arranged to control a film transport motor 9.

The camera further includes a spool 10 arranged to transport a film 13 through a transmission system (not shown) in a direction of an arrow shown in FIG. 1, a magnetic information recording circuit 11 arranged to record, by using a magnetic head 12, on the film 13 a variety of pieces of information such as title information set by the title information setting device 3, photo-taking information or photo-taking date, a film transport amount detecting circuit 14 arranged to detect the amount of transport of the film 13, a display circuit 15 arranged to display a variety of pieces of information such as the title information, the photo-taking information or the photo-taking date, a switch 16 (SW1) provided for starting light measurement and distance measurement (focus detection), a switch 17 (SW2) provided for starting an exposure, a GPS receiving enabling switch 18, and a title language selecting switch 19.

Figure 2:
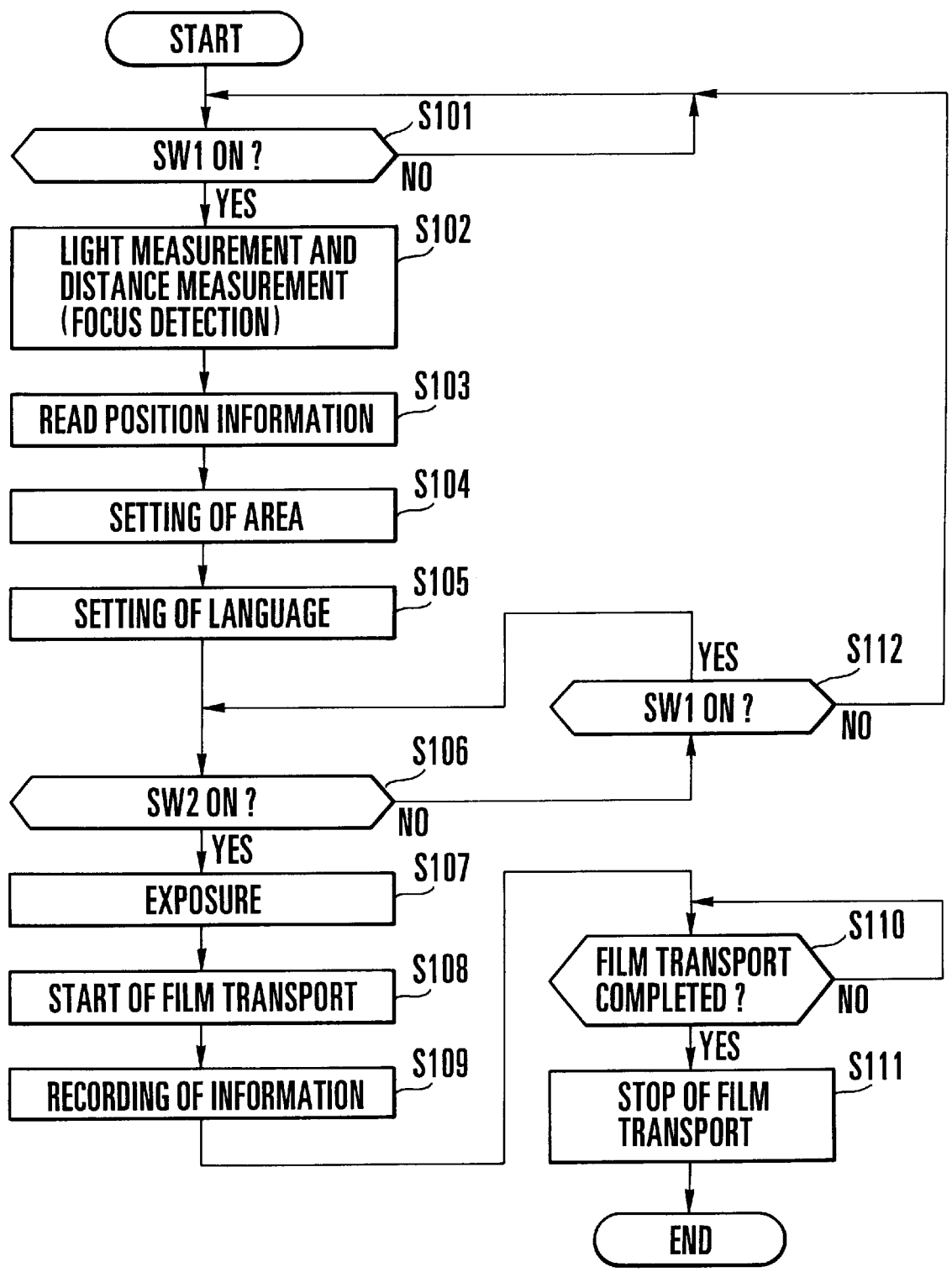
FIG. 2 is a flow chart showing a series of operations of the camera according to a first embodiment of the invention.

Next, a series of operations of the camera having the above-described construction will be described with reference to the flow chart of FIG. 2.

First, in step S101, the CPU 1 makes a check to find if the switch SW1 (16) provided for starting light measurement and distance measurement (focus detection) is turned on. If it is found that the switch SW1 is not turned on, the flow waits in this step S101. After that, when the switch SW1 is turned on, the flow proceeds to step S102. In step S102, the CPU 1 drives the light measuring circuit 5 and the distance measuring circuit 6 to obtain light measurement information and distance measurement (focus detection) information. In the next step S103, the CPU 1 causes the GPS receiving device 2 to receive radio waves from the satellites to read position information indicative of a position at which the current photo-taking operation is being performed. In the subsequent step S104, the CPU 1 sets an area corresponding to the position information read in the above step S103, from among a plurality of areas which are beforehand encoded and stored in the CPU 1. Then, in the next step S105, the CPU 1 sets a language corresponding to the area set in the above step S104, from among a plurality of languages which are beforehand encoded and stored in the CPU 1.

In the subsequent step S106, the CPU 1 makes a check to find if the switch SW2 (17) provided for starting an exposure is turned on. If it is found that the switch SW2 is not turned on, the flow proceeds to step S112. In step S112, the CPU 1 makes a check to find if the switch SW1 is turned on. If it is found that the switch SW1 is not turned on, the flow returns to step S101, so that the above-described operation is repeated. If it is found in step S106 that the switch SW2 is turned on, the flow proceeds to step S107.

In step S107, the CPU 1 causes the exposure control mechanism 7 to perform an exposure on the film 13. Then, in the next step S108, the CPU 1 drives the film transport motor 9 through the film transport driving circuit 8 to drive the spool 10 through the transmission system (not shown) so as to start transporting the film 13. In the subsequent step S109, the CPU 1 drives the magnetic information recording circuit 11 during the transport of the film 13 to record, by using the magnetic head 12, on the film 13 information such as the title set by the title information setting device 3, the photo-taking information or the photo-taking date for the photo-taken frame. In this instance, it goes without saying that the above information is recorded in the language set in the step S105. In the next step S110, the amount of transport of the film 13 is detected by the film transport amount detecting circuit 14 to find if the film 13 has been transformed by one frame portion. If it is found that the film 13 has been transformed by one frame portion, the flow proceeds to step S111. In step S111, the CPU 1 stops driving the film transport motor 9 to bring the transport of the film 13 to an end, and then, a photo-taking sequence is completed.

Incidentally, in the above first embodiment, there is shown an example in which recording of information on a film is performed with magnetic recording using a magnetic head. However, the recording of information may be performed with optical recording using a photoreflector or the like.

As described above, according to the first embodiment, the camera is arranged to select an area in which a photo-taking operation is currently being performed from a plurality of areas stored beforehand, on the basis of position information obtained by the GPS receiving device 2, and to automatically set a language of a title to be recorded to a language corresponding to the selected area among a plurality of languages stored beforehand.

Accordingly, there is no possibility of forgetting changing a language of a title to be recorded or making a mistake about the change of the language, and there is no need for the photographer to perform a troublesome operation.

Figure 3:
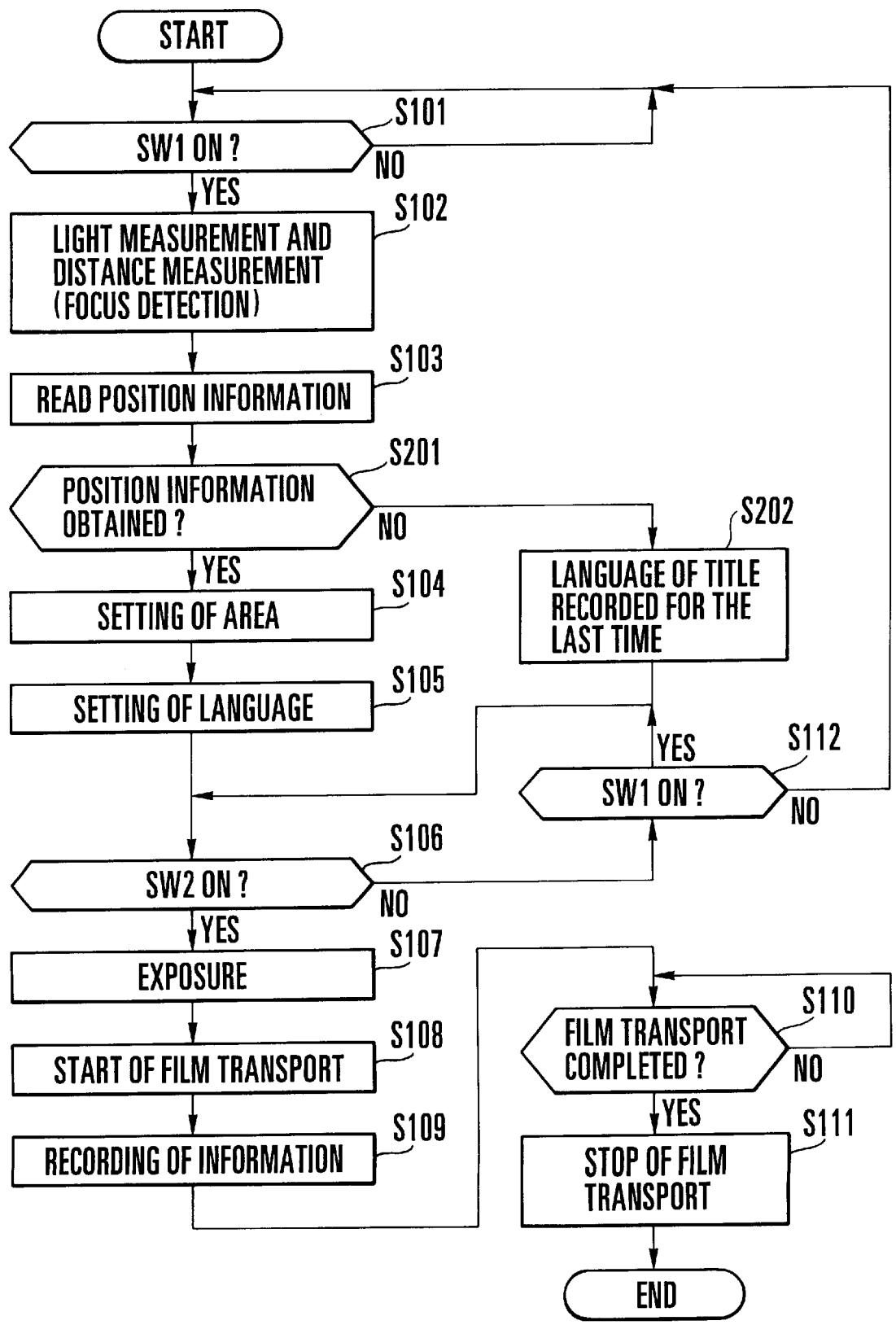
FIG. 3 is a flow chart showing a series of operations of the camera according to a second embodiment of the invention.

FIG. 3 is a flow chart showing a series of operations of a camera according to a second embodiment of the invention. In FIG. 3, the processes for the same operations as those shown in FIG. 2 are assigned the same step numbers as those in FIG. 2, and are, therefore, omitted from the following description. Further, the electrical arrangement of the camera according to the second embodiment is assumed to be the same as that shown in FIG. 1.

In step S103, the CPU 1 reads position information indicative of a position where a photo-taking operation is currently being performed, by causing the GPS receiving device 2 to receive radio waves from GPS satellites. In the next step S201, the CPU 1 makes a check to find if the position information has been obtained by the GPS receiving device 2. If it is found that the position information has been obtained, the flow proceeds to step S104 and steps subsequent thereto. If it is found that the position information has not been obtained, the flow proceeds to step S202. In step S202, the CPU 1 sets a language of a title to be recorded to the language of the title recorded for the last time. Then, the flow proceeds to step S106 and steps subsequent thereto.

As described above, according to the second embodiment, if the position information has not been obtained by the GPS receiving device 2, a title is made to be recorded in a language used for the last time. Accordingly, even if the position information has not been obtained because a photo-taking operation has been performed in a place where radio waves are hard to reach, such as the inside of a building, a room in the basement, etc., the language of the title used for the last time is automatically set in the camera. Therefore, there is no possibility that any title cannot be recorded or a title is recorded in an entirely-unintended language.

Figure 4:
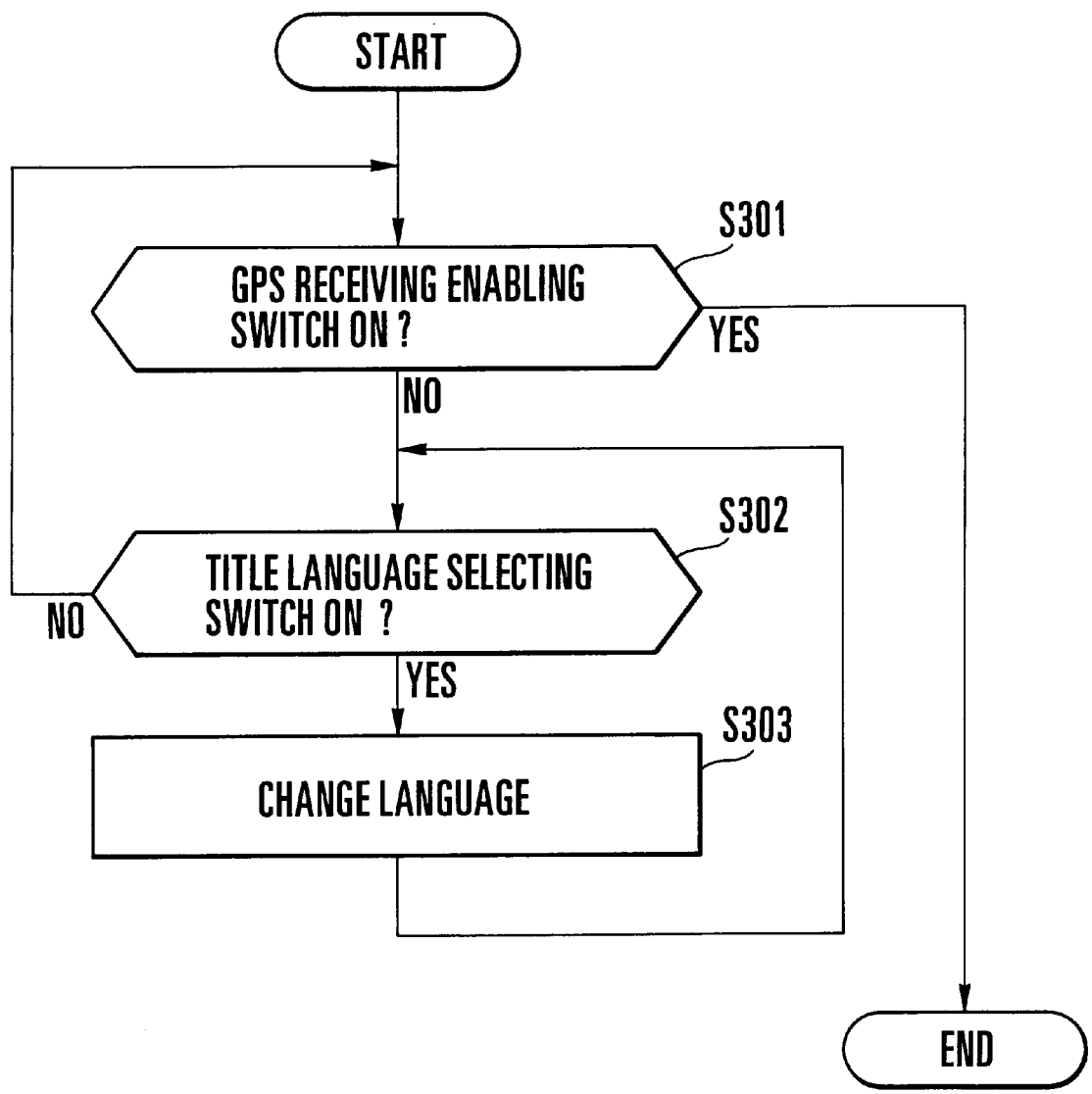
FIG. 4 is a flow chart showing an operation of setting a language of the title in the camera according to a third embodiment of the invention.

FIG. 4 is a flow chart showing the operation of essential portions of a camera according to a third embodiment of the invention. The electrical arrangement of the camera according to the third embodiment is assumed to be the same as that shown in FIG. 1.

In step S301, the CPU 1 makes a check to find if the GPS receiving enabling switch 18 is turned on. If it is found that the GPS receiving enabling switch 18 is turned off, the flow proceeds to step S302. In step S302, the CPU 1 makes a check to find if the title language selecting switch 19 is turned on. If it is found that the title language selecting switch 19 is not turned on, the flow returns to step S301. If it is found that the title language selecting switch 19 is turned on, the flow proceeds to step S303. In step S303, one of languages is hierarchically changed to another language every time the title language selecting switch 19 is turned on.

Figure 5:
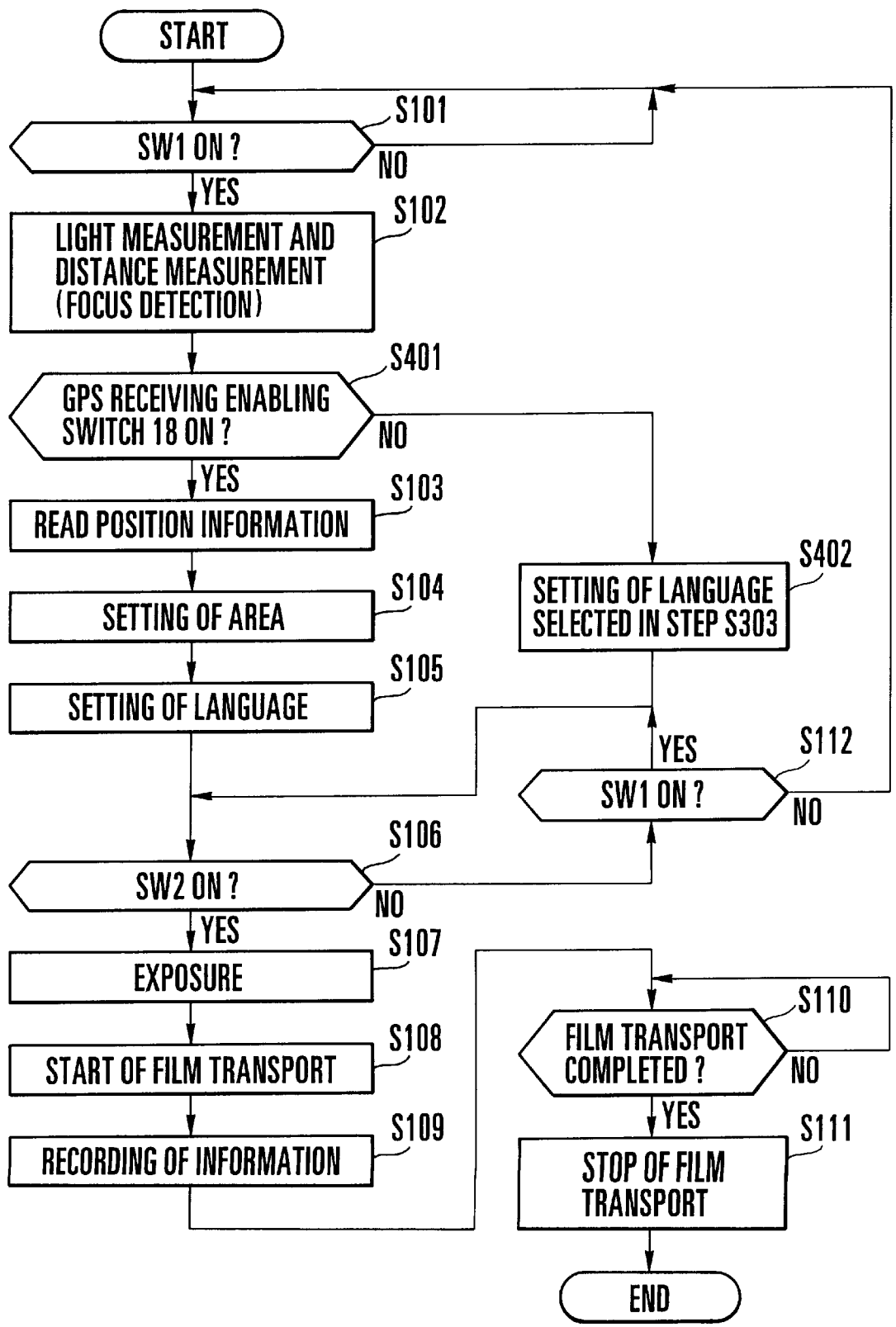
FIG. 5 is a flow chart showing a series of operations of the camera according to the third embodiment of the invention.

FIG. 5 is flow chart showing a series of operations of the camera arranged to be capable of manually setting a language of a title as described with reference to FIG. 4. In FIG. 5, the processes for the same operations as those shown in FIG. 2 are assigned the same step numbers as those in FIG. 2, and are, therefore, omitted from the following description.

In step S102, the CPU 1 obtains light measurement information and distance measurement information (focus detection information) by driving the light measuring circuit 5 and the distance measuring circuit (focus detecting circuit) 6. After that, the flow proceeds to step S401. In step S401, the CPU 1 makes a check to find if the GPS receiving enabling switch 18 is turned on. If it is found that the GPS receiving enabling switch 18 is turned on, the flow proceeds to step S103 and steps subsequent thereto. If it is found that the GPS receiving enabling switch 18 is turned off, the flow proceeds to step S402. In step S402, the CPU 1 sets the language selected in step S303 of FIG. 3 in the camera. Then, the flow proceeds to step S106 and steps subsequent thereto.

As described above, according to the third embodiment, when the GPS receiving enabling switch 18 is kept off, the photographer can arbitrarily set a desired language of a title by a manual operation irrespectively of a position where a photo-taking operation is currently being performed.

In each of the embodiments described above, a camera using a film as a recording medium is taken as an example for describing the invention. However, the invention may be applied to the so-called digital camera capable of recording an image, etc., on a memory or the like as a recording medium.

Further, although the camera has the GPS receiving device mounted thereto, the camera may be arranged to obtain received position information from an external GPS receiving device, thereby making it also possible to obtain the same advantageous effect.

As described above, according to each of the embodiments described above, there is provided a camera capable of setting an apposite language of a title without forcing the photographer to perform a troublesome operation in setting the language of a title and without causing the photographer to forget setting the language of a title or to make a mistake about the change of the language.

Further, there is provided a camera capable of preventing title information from failing to be recorded or preventing title information from being recorded in an entirely-undesired language, even if position information cannot be received because a photo-taking operation is currently being performed in a place where radio waves are hard to reach, such as the inside of a building, a room in the basement, etc.

Further, there is provided a camera capable of setting a desired language of a title irrespective of a position where a photo-taking operation is currently being performed.

What is claimed is:

1. A camera comprising:
    a recording device which records image information and character information on a recording medium;
    a receiving device provided for Global Positioning System; and
    a setting circuit which sets a language of the character information on the basis of position information obtained by said receiving device.

2. A camera according to claim 1, wherein the character information is title information related to the image information.

3. A camera according to claim 1, wherein the character information is photo-taking information.

4. A camera according to claim 1, wherein the character information is date information.

5. A camera according to claim 1, wherein the recording medium includes a film.

6. A camera according to claim 1, wherein the recording medium includes a memory.

7. A camera according to claim 1, wherein said recording device magnetically records the character information on the recording medium.

8. A camera according to claim 1, wherein said recording device optically records the character information on the recording medium.

9. A camera according to claim 1, wherein said setting circuit sets the language of the character information to a language used for last recording if said receiving device has not been able to receive the position information.

10. A camera according to claim 2, wherein said setting circuit sets the language of the character information to a language used for last recording if said receiving device has not been able to receive the position information.

11. A camera according to claim 3, wherein said setting circuit sets the language of the character information to a language used for last recording if said receiving device has not been able to receive the position information.

12. A camera according to claim 1, further comprising:
    selection member for selecting one of enabling and disabling of reception by said receiving device; and
    a inputting member for manually setting a language of the character information,
    wherein said setting circuit sets the language of the character information to the language manually set by said inputting member, if the disabling of reception is selected by said selection member.

13. A camera comprising:
    a recording device which records image information and character information on a recording medium; and
    a setting circuit which sets a language of the character information on the basis of position information obtained from a Global Positioning System and input to said camera.

14. A camera according to claim 13, wherein said camera includes a receiving device which receives position information from said Global Positioning System.

* * * * *

UNITED STATES PATENT AND TRADEMARK OFFICE
CERTIFICATE OF CORRECTION

PATENT NO.   : 6,160,964
DATED        : December 12, 2000
INVENTOR(S)  : Kazuo Imoto Page 1 of 1

It is certified that error appears in the above-identified patent and that said Letters Patent is hereby corrected as shown below:

<u>Column 6,</u>
Line 22, before "selection" insert -- a --.
Line 24, delete "a inputting" and insert -- an inputting --.

Signed and Sealed this

First Day of January, 2002

Attest:

*Attesting Officer*

JAMES E. ROGAN
*Director of the United States Patent and Trademark Office*